(12) United States Patent
Bowman

(10) Patent No.: US 11,648,497 B2
(45) Date of Patent: May 16, 2023

(54) MEDIA FILTER AND METHOD OF INSTALLATION

(71) Applicant: Carrier Corporation, Palm Beach Gardens, FL (US)

(72) Inventor: Ronald L. Bowman, Golden, CO (US)

(73) Assignee: CARRIER CORPORATION, Farmington, CT (US)

( * ) Notice: Subject to any disclaimer, the term of this patent is extended or adjusted under 35 U.S.C. 154(b) by 396 days.

(21) Appl. No.: 16/003,940

(22) Filed: Jun. 8, 2018

(65) Prior Publication Data

US 2018/0290090 A1    Oct. 11, 2018

Related U.S. Application Data

(62) Division of application No. 14/119,045, filed as application No. PCT/US2012/037759 on May 14, 2012, now Pat. No. 10,005,015.

(60) Provisional application No. 61/489,526, filed on May 24, 2011.

(51) Int. Cl.
*B01D 46/00* (2022.01)
*B03C 3/82* (2006.01)
(Continued)

(52) U.S. Cl.
CPC ...... *B01D 46/0002* (2013.01); *B01D 46/2411* (2013.01); *B01D 46/521* (2013.01);
(Continued)

(58) Field of Classification Search
CPC combination set(s) only.
See application file for complete search history.

(56) References Cited

U.S. PATENT DOCUMENTS 2,058,669 A * 10/1936 Dollinger ............. B01D 46/523
55/499
2,502,560 A * 4/1950 Dahlman ................ B03C 3/155
96/67
(Continued)

FOREIGN PATENT DOCUMENTS

DE    102011077715 A1 * 12/2012 ......... F02M 35/0245
FR       2940918 A3     7/2010
(Continued)

OTHER PUBLICATIONS

International Preliminary Report on Patentability; PCT/US2012/037759; dated Nov. 26, 2013; 8 Pages.
(Continued)

*Primary Examiner* — Christopher P Jones
*Assistant Examiner* — Sonji Turner
(74) *Attorney, Agent, or Firm* — Cantor Colburn LLP

(57) ABSTRACT

An air filtration system includes a frame directing an airflow through the air filtration system and a media filter disposed in the frame including one or more filtration elements. The system further includes one or more alignment features and one or more sealing elements interactive with the one or more alignment features to prevent incorrect installation of the media filter into the frame. A method of installing a media filter in an air filtration system includes aligning an alignment feature of the media filter with an opening in a frame of the air filtration system and inserting the media filter into the frame. The alignment feature ensures that the media filter is inserted in the frame in a correct orientation.

2 Claims, 5 Drawing Sheets

(51) Int. Cl.
*B01D 46/52* (2006.01)
*B01D 46/24* (2006.01)

(52) U.S. Cl.
CPC .......... *B03C 3/82* (2013.01); *B01D 2265/026* (2013.01); *B03C 2201/28* (2013.01); *Y10T 29/49826* (2015.01)

(56) References Cited

U.S. PATENT DOCUMENTS

| | | | |
|---|---|---|---|
| 2,908,348 A * | 10/1959 | Rivers | B01D 46/12 96/67 |
| 2,990,912 A | 7/1961 | Cole | |
| 3,177,637 A * | 4/1965 | Davis | B01D 46/0013 55/483 |
| 3,271,932 A * | 9/1966 | Newell | B03C 3/40 96/67 |
| 3,438,180 A * | 4/1969 | Klouda | B03C 3/155 96/58 |
| 3,494,113 A * | 2/1970 | Kinney | B01D 46/10 55/481 |
| 3,626,668 A | 12/1971 | Cardiff | |
| 3,733,793 A * | 5/1973 | Young | B01D 46/00 55/493 |
| 4,290,788 A * | 9/1981 | Pittman | B03C 3/66 55/481 |
| 4,465,499 A | 8/1984 | Wawro et al. | |
| 4,509,958 A * | 4/1985 | Masuda | B01D 46/10 55/500 |
| 4,595,401 A | 6/1986 | Witchell | |
| 4,685,944 A * | 8/1987 | Allan | B01D 46/0004 55/491 |
| 4,781,736 A | 11/1988 | Cheney et al. | |
| 4,792,344 A * | 12/1988 | Belcher | B01D 46/0075 55/299 |
| 4,853,005 A * | 8/1989 | Jaisinghani | B03C 3/155 96/60 |
| 4,878,149 A | 10/1989 | Stiehl et al. | |
| 4,940,470 A | 7/1990 | Jaisinghani et al. | |
| 5,330,559 A | 7/1994 | Cheney et al. | |
| 5,378,254 A * | 1/1995 | Maly | A61L 9/12 96/418 |
| 5,403,383 A * | 4/1995 | Jaisinghani | B03C 3/155 422/22 |
| 5,549,735 A | 8/1996 | Coppom | |
| 5,551,172 A * | 9/1996 | Yu | A43B 7/10 36/3 A |
| 5,620,505 A * | 4/1997 | Koch | B01D 46/521 96/134 |
| 5,735,918 A | 4/1998 | Barradas | |
| 5,840,094 A * | 11/1998 | Osendorf | B01D 46/0001 65/27 |
| 5,846,302 A | 12/1998 | Putro | |
| 5,935,281 A | 8/1999 | Rotheiser et al. | |
| 5,944,860 A * | 8/1999 | Mack | B01D 46/0005 55/492 |
| 6,099,612 A * | 8/2000 | Bartos | B01D 46/0005 55/481 |
| 6,126,708 A | 10/2000 | Mack et al. | |
| 6,251,171 B1 | 6/2001 | Marra et al. | |
| 6,263,713 B1 * | 7/2001 | Fantl | E05B 17/0004 225/2 |
| 6,264,713 B1 * | 7/2001 | Lewis, II | B01D 46/0005 55/481 |
| 6,425,932 B1 * | 7/2002 | Huehn | F24F 8/10 55/471 |
| 6,494,940 B1 * | 12/2002 | Hak | A61L 9/16 55/471 |
| 6,610,118 B2 * | 8/2003 | Bryce | B01D 46/10 55/467 |
| 6,679,940 B1 * | 1/2004 | Oda | A61L 9/22 96/55 |
| 6,814,660 B1 * | 11/2004 | Cavett | B01D 46/0005 454/284 |
| 6,849,107 B1 | 2/2005 | Huffman | |
| 6,860,916 B2 | 3/2005 | Kubokawa et al. | |
| 6,890,366 B2 * | 5/2005 | Bugli | B01D 46/0005 55/385.3 |
| 7,067,939 B2 | 6/2006 | Hartmann et al. | |
| 7,141,198 B2 | 11/2006 | Stankowski et al. | |
| 7,156,898 B2 | 1/2007 | Jaisinghani et al. | |
| 7,160,363 B2 | 1/2007 | Kulmala et al. | |
| 7,212,393 B2 | 5/2007 | Gefter et al. | |
| 7,247,183 B2 * | 7/2007 | Connor | B01D 46/0002 55/495 |
| 7,261,757 B2 * | 8/2007 | Duffy | B01D 46/0001 55/497 |
| 7,351,274 B2 | 4/2008 | Helt et al. | |
| 7,521,012 B2 | 4/2009 | Stankowski et al. | |
| 7,524,362 B2 * | 4/2009 | Wu | B01D 46/521 96/15 |
| 7,531,028 B2 * | 5/2009 | Mello | B03C 3/12 96/99 |
| 7,594,958 B2 | 9/2009 | Krichtafovitch et al. | |
| 7,608,135 B2 * | 10/2009 | Mello | B03C 3/09 96/99 |
| 7,785,403 B2 * | 8/2010 | Ouyang | B03C 3/68 96/18 |
| 7,815,719 B2 | 10/2010 | McKinney et al. | |
| 7,815,720 B2 | 10/2010 | McKinney | |
| 7,914,604 B2 * | 3/2011 | Mello | B03C 3/155 95/79 |
| 7,959,700 B2 * | 6/2011 | Kidman | B01D 46/10 55/497 |
| 7,972,401 B2 * | 7/2011 | Stock | F04B 39/0038 55/483 |
| 8,080,094 B2 * | 12/2011 | Vanderginst | B03C 3/09 96/66 |
| 8,142,537 B2 * | 3/2012 | Braithwaite | B01D 46/521 55/499 |
| 8,182,571 B2 * | 5/2012 | Kailani | F24F 8/10 55/511 |
| 8,404,115 B2 * | 3/2013 | Myers | B01D 46/0002 210/232 |
| 8,613,785 B1 * | 12/2013 | Davis | B01D 46/10 55/495 |
| 9,034,068 B2 * | 5/2015 | Ball | B01D 46/0005 55/483 |
| 9,370,741 B2 * | 6/2016 | Horey | B01D 46/009 |
| 9,764,266 B1 * | 9/2017 | Carter | B01D 46/002 |
| 2002/0152890 A1 | 10/2002 | Leiser | |
| 2003/0071521 A1 | 4/2003 | Hartmann et al. | |
| 2004/0004797 A1 | 1/2004 | Krichtafovitch et al. | |
| 2004/0074387 A1 | 4/2004 | Jaisinghani | |
| 2004/0163370 A1 * | 8/2004 | Haute | B01D 46/002 55/483 |
| 2005/0109204 A1 * | 5/2005 | Coppom | B03C 3/09 95/15 |
| 2005/0284116 A1 * | 12/2005 | Duffy | B01D 46/521 55/497 |
| 2006/0108278 A1 * | 5/2006 | Scholl | B01D 46/10 210/450 |
| 2006/0150816 A1 | 7/2006 | Jaisinghani | |
| 2006/0180023 A1 | 8/2006 | Coppom et al. | |
| 2006/0236667 A1 | 10/2006 | Terlson | |
| 2007/0039472 A1 | 2/2007 | Bias et al. | |
| 2008/0034974 A1 * | 2/2008 | Uemura | F02M 35/024 96/136 |
| 2008/0156186 A1 | 7/2008 | Mckinney | |
| 2009/0025402 A1 * | 1/2009 | Mello | B03C 3/09 62/78 |
| 2009/0025559 A1 * | 1/2009 | Mello | F24F 8/192 96/57 |
| 2009/0183474 A1 | 7/2009 | Workman | |
| 2009/0183477 A1 | 7/2009 | Workman | |
| 2009/0183636 A1 * | 7/2009 | Levine | B01D 46/521 96/397 |
| 2010/0000190 A1 * | 1/2010 | Kidman | B01D 46/52 55/502 |
| 2010/0236205 A1 * | 9/2010 | Braithwaite | B01D 46/10 55/499 |

(56) References Cited

U.S. PATENT DOCUMENTS

| | | |
|---|---|---|
| 2010/0251895 A1 | 10/2010 | Vanderginst |
| 2011/0006216 A1 | 1/2011 | Searle |
| 2011/0030322 A1* | 2/2011 | Gillispie ............... B01D 46/521 55/313 |
| 2011/0219954 A1 | 9/2011 | Mckinney |
| 2011/0308213 A1* | 12/2011 | Gillispie ................ B01D 46/10 55/499 |
| 2013/0318936 A1* | 12/2013 | Ball ..................... B01D 46/001 55/483 |
| 2014/0096680 A1 | 4/2014 | Ackley et al. |
| 2014/0109768 A1 | 4/2014 | Bowman |

FOREIGN PATENT DOCUMENTS

| | | |
|---|---|---|
| GB | 464192 A | 4/1937 |
| WO | 2010085253 A1 | 7/2010 |
| WO | WO-2010085253 A1 * | 7/2010 ............. B03C 3/017 |

OTHER PUBLICATIONS

International Preliminary Report on Patentability; PCT/US2012/037763; dated Nov. 26, 2013; 8 Pages.

International Search Report for International Application No. PCT/US2012/037759; International Filing Date May 14, 2012; dated Sep. 25, 2012; 4 Pages.

International Search Report for International Application No. PCT/US2012/037763; International Filing Date May 14, 2012; dated Sep. 28, 2012; 4 Pages.

Written Opinion for International Application No. PCT/US2012/037759; International Filing Date May 14, 2012; dated Sep. 25, 2012; 8 Pages.

Written Opinion for International Application No. PCT/US2012/037763; International Filing Date May 14, 2012; dated Sep. 28, 2012; 8 Pages.

* cited by examiner

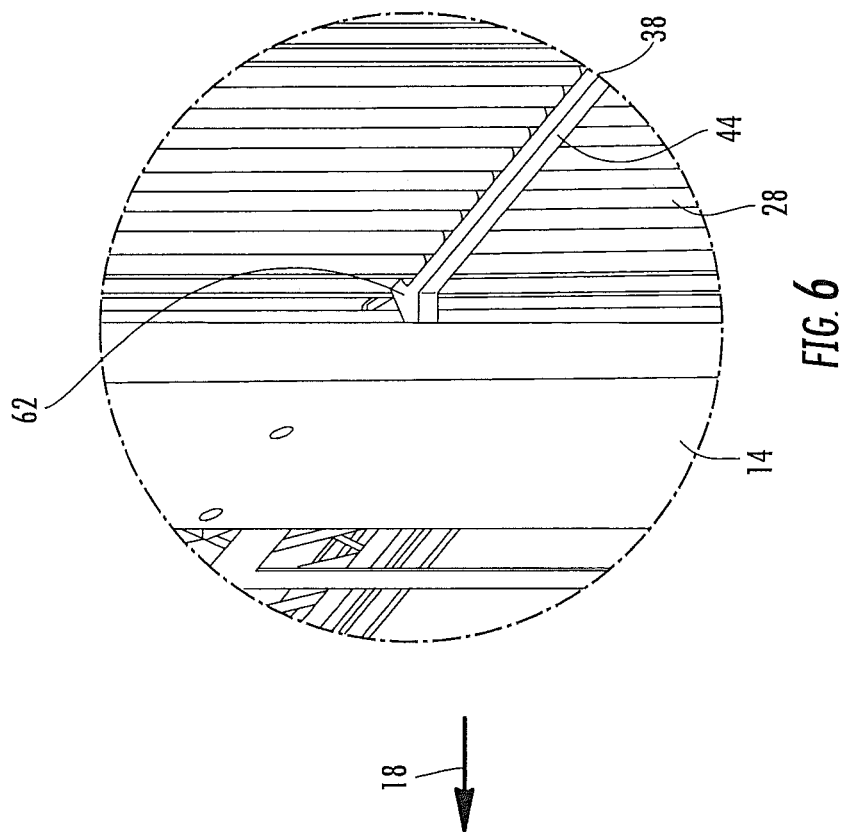
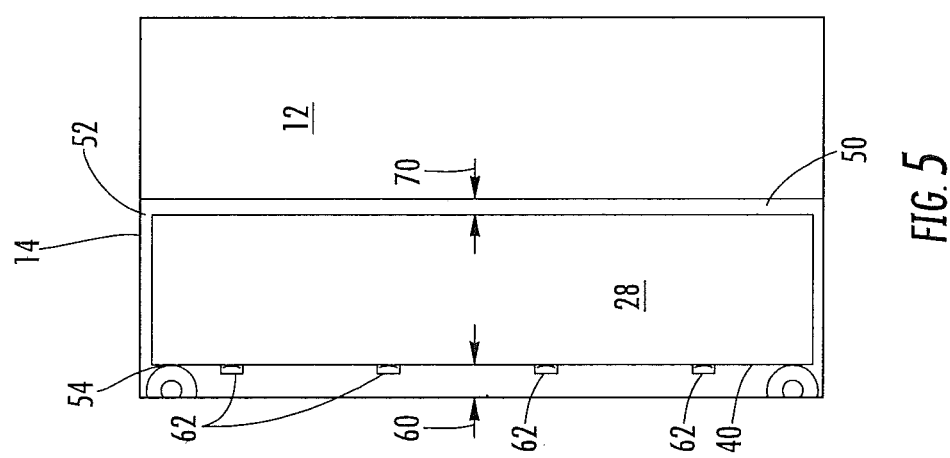
FIG. 6
FIG. 5

MEDIA FILTER AND METHOD OF INSTALLATION

CROSS-REFERENCE TO RELATED APPLICATIONS

This application is a divisional application of U.S. patent application Ser. No. 14/119,045 filed Nov. 20, 2013, which claims the benefit of an earlier filing date from PCT Patent Application Number PCT/US12/37759, filed May 14, 2012, which claims the benefit of an earlier filing date of U.S. Patent Application No. 61/489,526, filed May 24, 2011 the contents of which are incorporated by reference herein in their entirety.

BACKGROUND

The subject matter disclosed herein relates to air filtration systems. More specifically, filters for electrostatic air filtration systems and installation thereof.

In air filtration systems, for example, electrically enhanced air filtration systems, electrostatic filters installed in the systems collect impurities in an airflow through the system before the airflow is circulated through a space such as a home or other building. Such filters are periodically removed and replaced as their effectiveness diminishes. In some systems, improper filter installation, or installation of an incorrect filter as a replacement can result in reduced effectiveness of the filter and the filtration system, and in some cases safety issues.

BRIEF DESCRIPTION

According to one aspect of the invention, a media filter for an air filtration system includes a filtration element and one or more alignment features. The one or more alignment features are interactive with one or more sealing elements of the air filtration system to prevent incorrect installation of the media filter into the air filtration system.

According to another aspect of the invention, an air filtration system includes a frame directing an airflow through the air filtration system and a media filter located in the frame including one or more filtration elements. The system further includes one or more alignment features and one or more sealing elements that are interactive with the one or more alignment features to prevent incorrect installation of the media filter into the frame.

According to yet another aspect of the invention, a method of installing a media filter in an air filtration system includes aligning an alignment feature of the media filter with an opening in a frame of the air filtration system and inserting the media filter into the frame. The alignment feature ensures that the media filter is inserted in the frame in a correct orientation.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 5 is a view of an embodiment of a media filter being installed in an air filtration system;

FIG. 6 is a enlarged view of the circled portion of FIG. 5;

The detailed description explains embodiments of the invention, together with advantages and features, by way of example with reference to the drawings.

DETAILED DESCRIPTION

Figure 1:
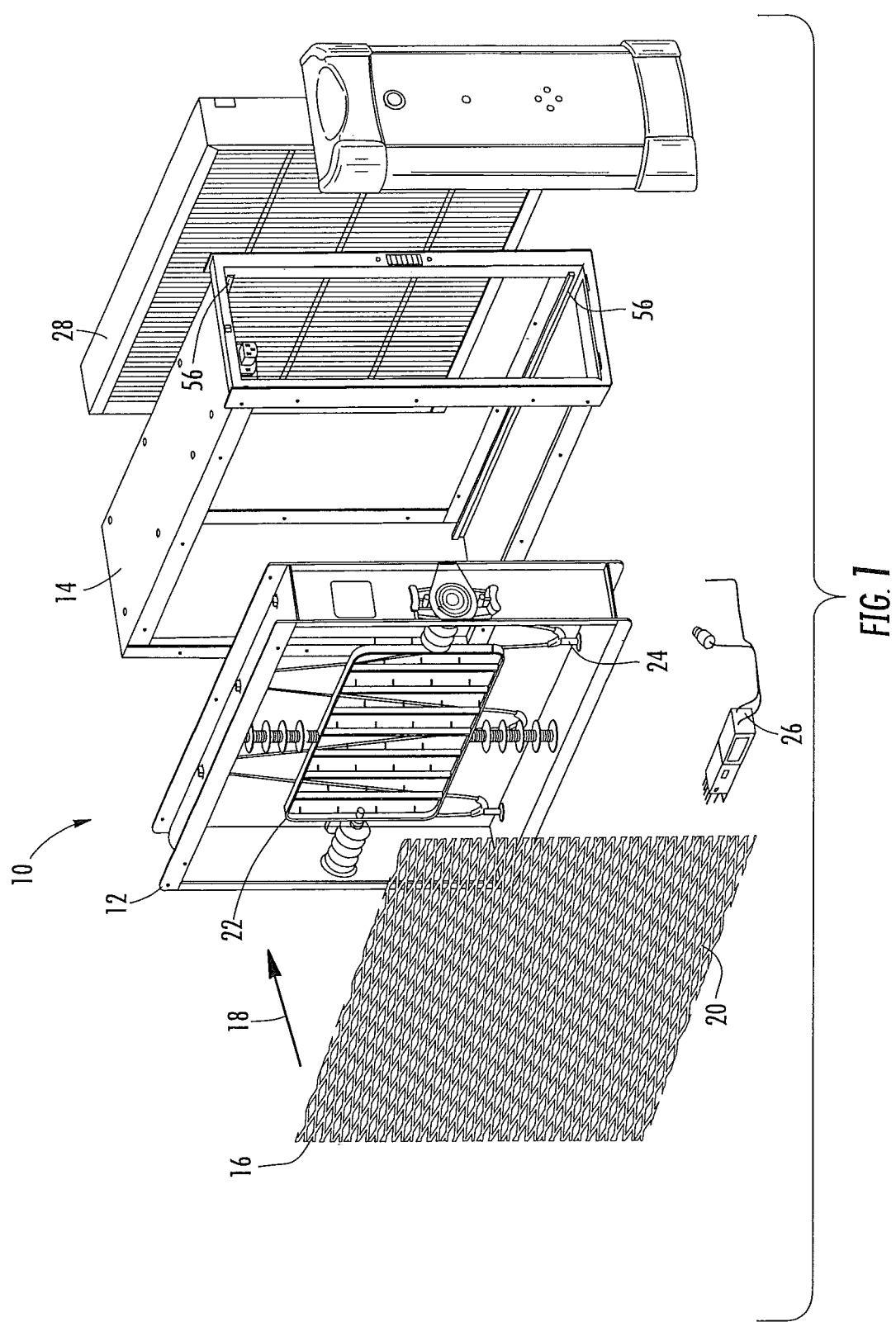
FIG. 1 schematically illustrates an embodiment of an air filtration system.

Shown in FIG. 1 is a view of an embodiment of an air filtration system 10. The air filtration system 10 of FIG. 1 is an electrically enhanced air filtration system 10, but it is to be appreciated that utilization of the present invention with other types of air filtration systems 10 having replaceable filters is contemplated within the present scope.

The air filtration system 10 includes a filter enhancement module (FEM) 12, shown in FIG. 1. At an upstream end 16 of the FEM 12, relative to an airflow direction 18 of air through the filtration system 10 is a safety screen 20 which also acts as an upstream ground for the FEM 12. Downstream of the safety screen 20 is an ionization array 22, and a field-generating array 24 located downstream of the ionization array 22. The ionization array 22 is an array of points sufficiently sharp such as to produce corona discharge when a pre-determined voltage is applied. For example, the ionization array may comprise a plurality of thin wires, barbed wires, or any structure capable of producing the corona needed to yield ions. The field-generating array 24 and the ionization array 22 are both connected to and powered by a high voltage power supply 26. The FEM 12 is located and secured in a frame 14 of the filtration system 10. A media filter 28 is disposed in the frame 14 downstream of the field-generating array 24.

Figure 2:
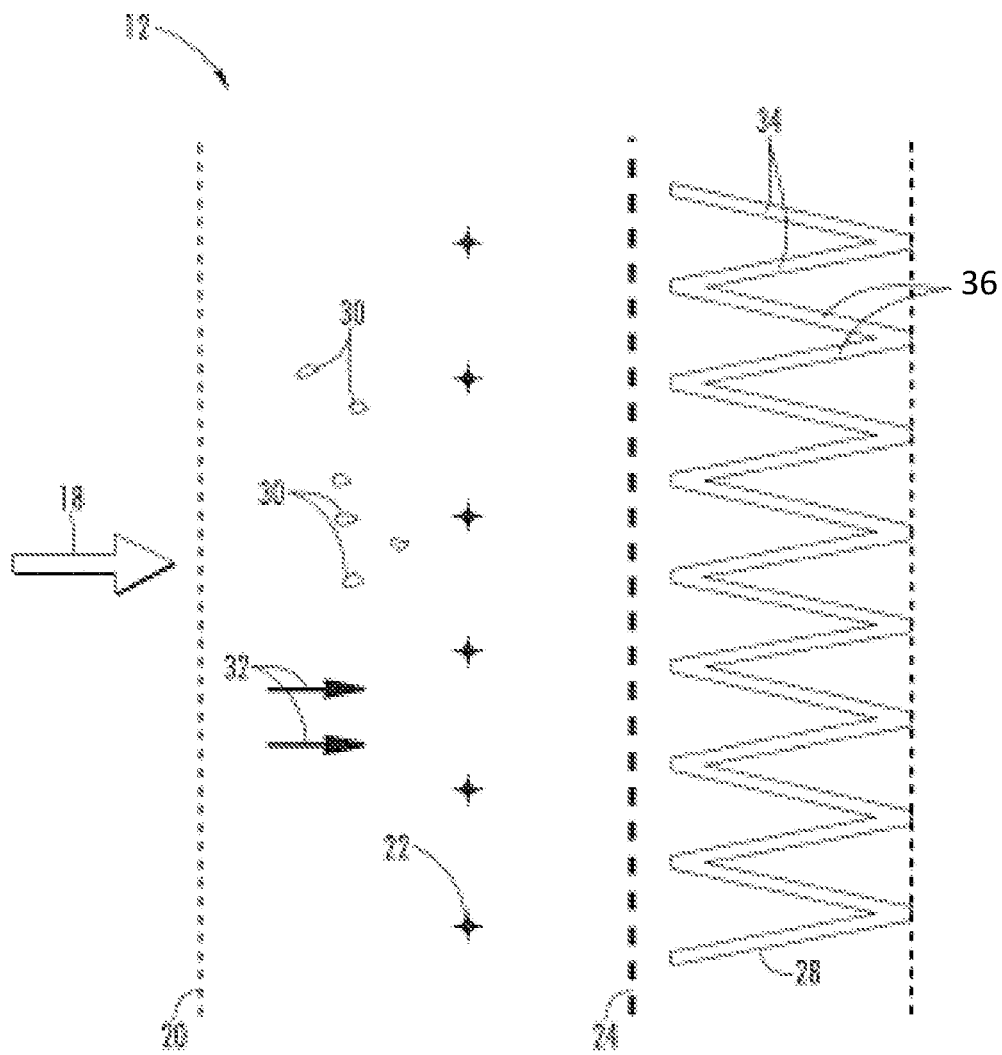
FIG. 2 is a schematic cross-sectional view of an embodiment of an air filtration system.

Referring now to FIG. 2, when the power supply 26 is activated, the ionization array 22 ionizes particles 30 in an airstream 32 passing through the FEM 12. The voltage across the field-generating array 24 polarizes media fibers 34 of the media filter 28, which causes the ionized particles 30 to be attracted to and captured by the media fibers 34.

Figure 3:
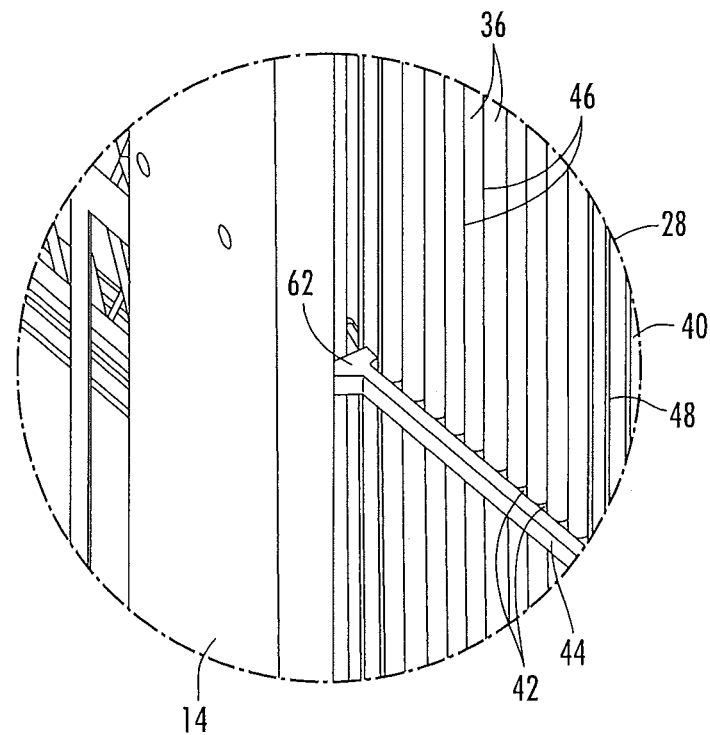
FIG. 3 is a schematic view of an embodiment of a media filter for an air filtration system.
Figure 4:
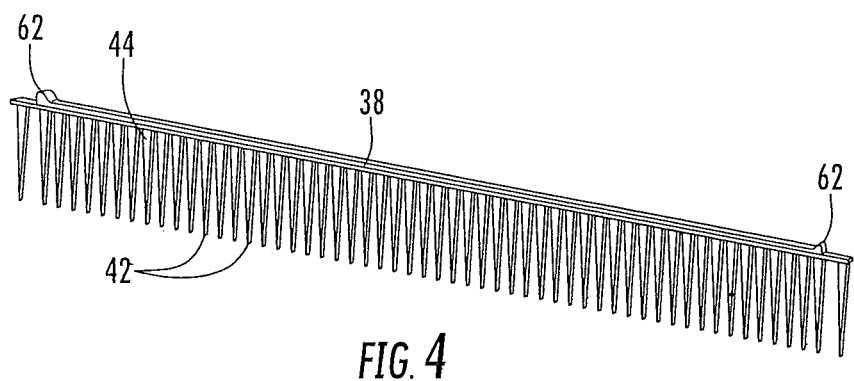
FIG. 4 illustrates an embodiment of a comb for a media filter if an air filtration system.

The media filter 28 comprises the plurality of media fibers 34 arranged in a plurality of pleats 36. One or more combs 38 are inserted in the media filter 28 from a downstream side 40 of the media filter 28 to separate the pleats 36 and to keep the pleats 36 from collapsing. As shown in FIG. 4, the comb 38 includes a plurality of comb teeth 42 extending from a spine 44. Referring again to FIG. 3, the comb 38 is inserted into the media filter 28 such that the comb teeth 42 extend between adjacent pleats 36 of the plurality of pleats 36 to keep the adjacent pleats 36 separated.

In some embodiments, the media filter 28 must be placed in close proximity to the field-generating array 24 so the desired electrical field is generated in the media fibers 34. The media filter 28 thus contacts or has a small gap to the field generating array 24. Further, the media filter 28 is configured to have a grounded downstream side 40. In some embodiments, the downstream side 40 of the media filter 28 includes a carbon paint on tips 46 of the plurality of pleats 36 to create a grounding plane 48 at the downstream side 40. During the operational life of the filtration system 10, the media filter 28 is often replaced with a replacement media filter 28. Because of the unique features of an upstream side and the downstream side 40 of the media filter 28, it is imperative that the replacement media filter 28 is installed in the correct orientation. Such correct orientation of the media filter 28 is critical to the operation and function of the electrically-enhanced air filtration system 10.

Figure 8:
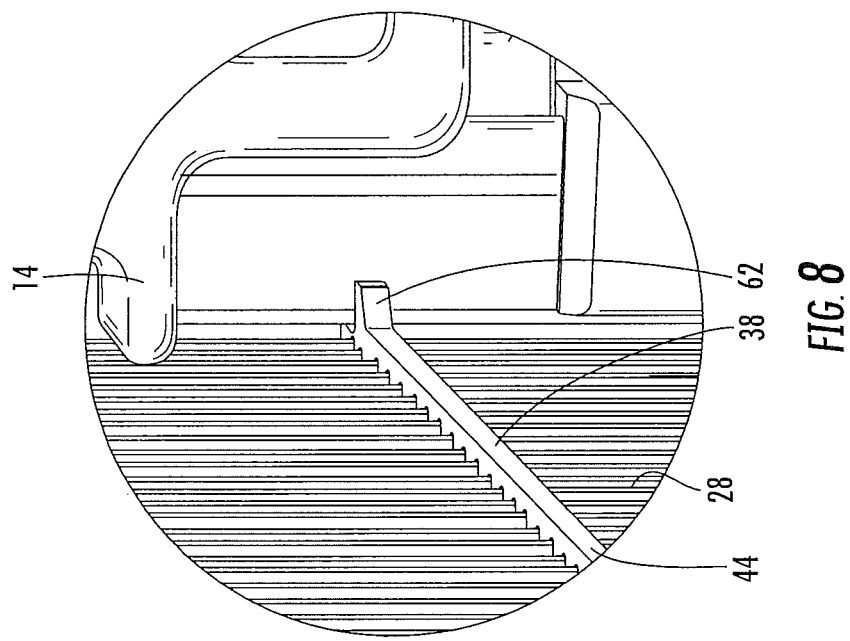
FIG. 8 is an enlarged view of the circled portion of FIG. 7.
Figure 7:
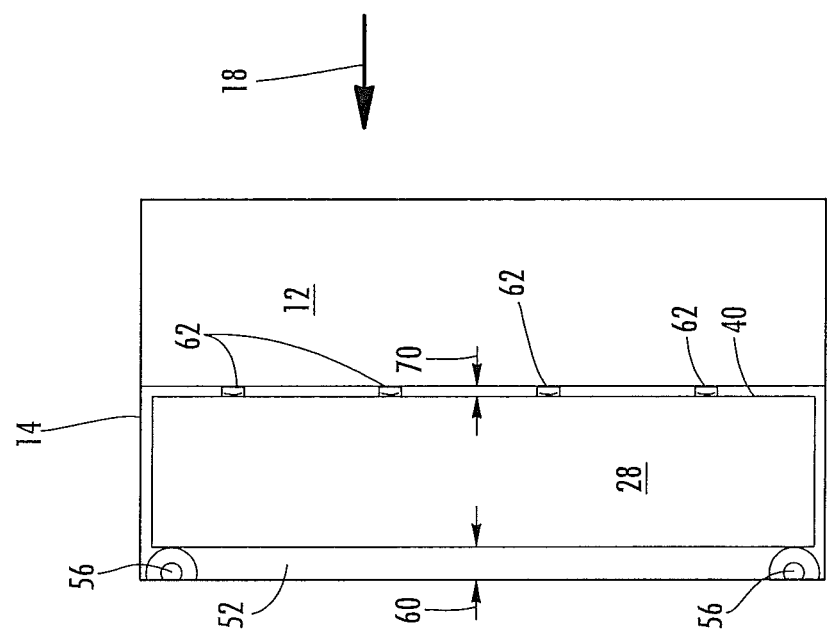
FIG. 7 is a view of an embodiment of a media filter being incorrectly installed in an air filtration system.

Referring to FIG. 5, the media filter 28 is slidable into a filter opening 52 in the frame 14. When installed, a downstream filter frame 54 contacts an air sealing element 56 protruding from the frame 14 and extending substantially along an insertion direction of the media filter 28. The contact between the sealing element 56 and the media filter 28 prevents the airstream 32 from moving around the media filter 28, forcing the airstream 32 through the media filter 28. Thus, when the media filter 28 is properly installed in the frame 14, because of the presence of the sealing element 56, a downstream filter gap 60 between the downstream side 40 and the frame 14 is larger than an upstream filter gap 70 between the upstream side 50 and the field-generating array 24 and/or frame 14. As shown in FIG. 6, the comb 38 includes one or more tabs 62, or other similar features, extending from the spine 44 in a substantially downstream direction. The tabs 62 are configured such that when the media filter 28 is oriented correctly at installation, as the media filter 28 is moved into the filter opening 52, the tabs 62 do not interfere with the frame 14, thus allowing installation of the media filter 28. If, however, as shown in FIGS. 7 and 8, a user attempts to install the media filter 28 with the downstream side 40 facing an upstream direction, the tabs 62 interfere with field-generating array 24 and/or the frame 14, thus not allowing the media filter 28 to be installed in this incorrect orientation. The presence of the sealing element 56 at the downstream side causes the creation of the downstream filter gap 60 which allows for passage of the tabs 62 past the frame 14 allowing for full installation of the media filter 28.

In some embodiments, further sealing elements may be included which are located substantially perpendicular to the insertion direction of the media filter 28. In the embodiment described above, the additional sealing elements are located either on the ends of the media filter 28 or on the downstream side 40 of the media filter 28 to ensure creation of the downstream filter gap 60 by the sealing elements 56.

The sealing elements 56 described herein may be of any suitable cross-sectional shape including, for example, fin seals or bulb seals. It is to be appreciation that these configurations are merely exemplary and other cross-sectional shapes are within the scope of the present disclosure.

In other embodiments, the configuration may be substantially reversed. In such embodiments, the protruding or raised sealing element 56 is located at the media filter 28 and the tabs 62 or other alignment features are located at the frame 14. Similar to the embodiment described above, attempting to install a media filter 28 incorrectly will result in interference between the media filter 28 and the tabs 62, thus not allowing the installation to be completed. Further, additional sealing elements perpendicular to the insertion direction of the media filter 28 may be included and located on the frame 14.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for installing a media filter in an air filtration system comprising the method steps of:
   aligning an alignment feature of the media filter with an opening in a frame of the air filtration system; and
   inserting the media filter into the frame, the alignment feature ensuring that the media filter is inserted in the frame in a correct orientation;
   wherein the alignment feature is configured such that the media filter is installable into the frame when the media filter is installed in the frame with the alignment feature extending downstream relative to a direction of airflow through the air filtration system, and such that the alignment feature interferes with one or more elements of the air filtration system when an attempt is made to install the media filter into the frame with the alignment feature extending upstream relative to the direction of airflow;
   wherein the media filter is electrically polarized via proximity to a field-generating array disposed directly upstream of the media filter;
   wherein the media filter comprises:
      a plurality of media fibers arranged in a plurality of pleats; and
      a comb inserted into the media filter, the comb including:
         a plurality of comb teeth extending from a spine; and
         two localized tabs extending from the spine in a downstream direction;
   wherein the alignment feature is a tab of the two tabs; and
      wherein the two tabs are located at opposing lateral ends of the comb.

2. An air filtration system comprising:
   a frame directing an airflow through the air filtration system;
   a media filter disposed in the frame; and
   one or more sealing elements disposed between the media filter and the frame, the one or more sealing elements are interactive with the media filter to seal between the media filter and the frame; and
   two alignment features to prevent incorrect installation of the media filter into the frame;
   wherein the two alignment features are configured such that the media filter is installable into the frame when the media filter is installed in the frame with the two alignment features extending downstream relative to a direction of airflow through the air filtration system, and such that the two alignment features interfere with one or more elements of the air filtration system when an attempt is made to install the media filter into the frame with the two alignment features extending upstream relative to the direction of airflow;
   wherein the media filter is electrically polarized via proximity to a field-generating array disposed directly upstream of the media filter;

wherein the media filter comprises:
  a plurality of media fibers arranged in a plurality of pleats; and
  a comb inserted into the media filter, the comb including:
    a plurality of comb teeth extending from a spine; and
    two localized tabs extending from the spine in a downstream direction;
wherein the two alignment features are the two tabs; and
wherein the two tabs are located at opposing lateral ends of the comb.

\* \* \* \* \*